US012306623B2

(12) United States Patent
Mullen et al.

(10) Patent No.: US 12,306,623 B2
(45) Date of Patent: May 20, 2025

(54) ELECTRIC HEAT TRACE POWER DISTRIBUTION AND MONITORING SYSTEM FOR FAULT DETECTION AND PREDICTIVE MAINTENANCE

(71) Applicant: CIAC SYSTEMS, LLC, Sunny Isles Beach, FL (US)

(72) Inventors: Timothy R. Mullen, Sunny Isles Beach, FL (US); Robert H. B. Netzer, N. Scituate, RI (US); John R. Caruso, Dayville, CT (US)

(73) Assignee: CIAC SYSTEMS, LLC, Sunny Isles Beach, FL (US)

( * ) Notice: Subject to any disclaimer, the term of this patent is extended or adjusted under 35 U.S.C. 154(b) by 0 days.

(21) Appl. No.: 18/316,163

(22) Filed: May 11, 2023

(65) Prior Publication Data

US 2023/0367308 A1   Nov. 16, 2023

Related U.S. Application Data

(60) Provisional application No. 63/476,683, filed on Dec. 22, 2022, provisional application No. 63/364,717, filed on May 13, 2022.

(51) Int. Cl.
*G05B 23/02* (2006.01)
*H05B 3/74* (2006.01)

(52) U.S. Cl.
CPC ....... *G05B 23/0283* (2013.01); *G05B 23/024* (2013.01); *H05B 3/746* (2013.01)

(58) Field of Classification Search
CPC ............. G05B 23/0283; G05B 23/024; G05B 19/0428; H05B 3/746; G01R 31/58
See application file for complete search history.

(56) References Cited

U.S. PATENT DOCUMENTS

| 6,907,363 | B1 * | 6/2005 | Wyant | G01R 27/18 |
| | | | | 702/65 |
| 9,078,292 | B1 | 7/2015 | Mullen | |
| 2016/0245447 | A1 * | 8/2016 | Crombie | H04W 84/18 |
| 2017/0045412 | A1 * | 2/2017 | Yunker | G01M 3/18 |
| 2017/0248978 | A1 * | 8/2017 | Mullen | H05B 1/0291 |
| 2017/0322169 | A1 | 11/2017 | Youssi et al. | |
| 2017/0351232 | A1 * | 12/2017 | Chen | G05B 19/00 |
| 2020/0256737 | A1 * | 8/2020 | Litteaur | G01K 7/06 |

(Continued)

OTHER PUBLICATIONS

PCT Patent Application No. PCT/US23/66911—Patent Cooperation Treaty PCT Written Opinion of the International Searching Authority—Completed Oct. 6, 2023 (mailed Nov. 9, 2023).

(Continued)

*Primary Examiner* — Michael J Dalbo
*Assistant Examiner* — Denise R Karavias
(74) *Attorney, Agent, or Firm* — Lott & Fischer, PL

(57) ABSTRACT

Described is an electrical power distribution and monitoring system utilizing electrical heat tracing equipment for purposes of fault detection and maintenance forecasting, the system is intended to replace or augment an existing Electric Heat Trace Distribution Panel, and comprises components for testing, measuring, recording, and displaying a variety of sensors, parameters and components, and to forecast failures and required maintenance in electrical heat trace equipment.

5 Claims, 6 Drawing Sheets

(56) References Cited

U.S. PATENT DOCUMENTS

2021/0116492 A1* 4/2021 Xu .................... G01R 31/14
2023/0282098 A1* 9/2023 de la Chevrotiere ...............
                                                H05B 1/0244

OTHER PUBLICATIONS

PCT Patent Application No. PCT/US23/66911—Patent Cooperation Treaty PCT International Search Report of the International Searching Authority—Completed Oct. 6, 2023 (mailed Nov. 9, 2023).

* cited by examiner

ELECTRIC HEAT TRACE POWER DISTRIBUTION AND MONITORING SYSTEM FOR FAULT DETECTION AND PREDICTIVE MAINTENANCE

CLAIM OF PRIORITY

This application is being filed as a non-provisional patent application under 35 U.S.C. § 111(b) and 37 CFR § 1.53(c). This application claims priority under 35 U.S.C. § 119(e) to U.S. provisional patent application Ser. No. 63/364,717 filed on May 13, 2022, and U.S. provisional patent application Ser. No. 63/476,683 filed on Dec. 22, 2022, the contents of which are incorporated herein by reference.

FIELD OF INVENTION

The invention relates generally to electrical monitoring systems, and in particular, to an electrical power distribution and monitoring system utilizing electrical heat tracing equipment for purposes of fault detection and maintenance forecasting.

BACKGROUND OF THE INVENTION

About "Electric Heat Trace"

An electric heat trace ("EHT") system is an electrical system used to maintain or raise the temperature of pipes and vessels. Heating is achieved by utilizing a resistant element that is run alongside the piping or vessel and increases in temperature as current flows through the resistant element. Typically, EHT cable comprises a single conductor, or a pair of longitudinal conductors, and a resistive element that is in contact with the conductor(s) along the length of the cable. One type of electric heat trace technology commonly referred to as "SR" (or self-regulating) cable, utilizes a self-regulating polymer as the resistive element, which controls the wattage of the element. When the cable is exposed to higher temperatures, the polymer has a high resistance and there is low, or no, current flowing from the conductor (s) through the resistive element. When the ambient temperature drops, the polymer creates conductive pathways that allow current to flow through the resistive element and heat to be produced. This "SR" heat trace cable has a variable wattage heat output based on the ambient temperature it is exposed to.

Another type of electric heat trace technology is commonly referred to as "MI" (or mineral insulated) cable, constructed of one or two solid series resistor element(s) embedded in a highly compacted mineral insulation, all enveloped by a stainless-steel outer sheath. This type of heat trace cable produces a constant wattage heat output which is not affected by the ambient temperature.

In the operation of many different types of industrial plants (power generation, pulp and paper, chemical, for example) there exists a need to deploy electric heat trace systems. The purpose of an electric heat trace system is to prevent pipe freeze up when temperatures fall, and/or to maintain process pipe temperature for process efficiencies. If either of these conditions occur (pipe freeze or process media temperature decline), the result can have serious impact upon the ability of the plant to operate at proper efficiency, or to have the plant operate at all.

Additionally, once one of these conditions has taken place, it requires immediate attention and significant time from plant personnel to resolve the issue. Since these conditions are always an "upset" and never a "scheduled occurrence", they normally take personnel away from doing constructive and revenue generating activities. Therefore, when an electric heat trace system fails to keep pipes from freezing or from maintaining a set process temperature, it is always a double loss to the operations of the plant:
  lost revenues from poor or non-existent operations
  lost wages for utilizing plant personnel on non-productive activities Value of a Properly Functioning Electric Heat Trace System The value of a properly functioning electric heat trace system is that it acts as "insurance" against catastrophic failures, maintaining critical process availability, and providing for ease of maintenance and troubleshooting should a problem occur. The benefit to the day-to-day operations is to allow plant management the higher value use of their skilled, trained and knowledgeable technicians. Diverting resources and personnel to fix problems caused by a frozen pipe, as an example, is not the best use of the limited resources (highly trained technicians) of most industrial plants. And most importantly, whenever an upset occurs, it causes a potential deficiency in the revenue opportunity to the plant.

Whether it is a total inability of the plant to operate (e.g. a drum level control transmitter at a power plant freezing, creating a "zero" reading thereby not allowing the plant control system to "fire" the boiler) or simply a process temperature not being maintained (e.g. coconut oil component of a chocolate manufacturer being too cold to maintain desired flow rates causing severe delays in the manufacturing cycle), malfunctioning electric heat trace systems can create significant problems and losses for industrial plants.

Realities of Most Operating Plants

Even with the potential problems identified to the plant, its personnel, and its profits, the realities of most systems are that the heat trace is often the "last item" on a project and the budget is nearly gone when it is time to specify the proper hardware and installation of the electric heat trace system. This inevitably leads to poor practices in the design and execution of the system, such as using multiple EHT circuits per circuit breaker; poorly labeled breaker panel/line list due to changes in the field; ineffective design (e.g. not enough watts/foot for pipe size for insulation type and thickness); and little thought given to operating functionality and maintenance concerns.

Electric heat trace systems, even with proper design and specification, can still malfunction once installed in the field. The most common causes of these malfunctions are:
  moisture intrusion from poor installation practices (junction boxes; conduit; insulation barriers, for example)
  insulation problems (poor installation, poor re-installation, moisture)
  maintenance on operating devices (valves, pumps, for example) leads to broken or damaged heat trace lines With the recognition of how important a properly functioning electric heat trace system can be to the operations and profitability of a plant, and with the knowledge that even a properly designed and installed system can develop problems over time, effective and reliable monitoring of the "health" of the electric heat trace system is critical.

Today's EHT Health and Monitoring Systems

The goal of an electric heat trace power distribution and monitoring system and/or an EHT systemwide plant audit should be simple—to alert plant personnel before a problem occurs that could cause a catastrophic failure, interrupt critical process availability, or diminish plant revenue generation.

The monitoring systems currently available can be as primitive as a simple LED on the end of an electric heat trace circuit (indication of voltage present at the LED indicating at least there is power to the heat trace), to a pipe temperature-sensing and breaker current-sensing multiple circuit system. Most systems fall somewhere in between, with the most common having local visual indication as the primary method of monitoring. Although local visual indication is the most common alarming method, it is also the least effective.

The idea behind existing electric heat trace system auditing services is a valid one. An EHT audit provides data on the most reliable indicator of an EHT's health and wellbeing—that of insulation resistance (resistance usually measured in meghoms). Moisture intrusion is the most prevalent contributor to an electric heat trace cable's degradation and failure, and a resistance measurement is more likely to capture that data than any other measurement. However, an electric heat trace audit can only provide data at a specific moment in time, a "snapshot" that may or (more likely) may not provide accurate data as to the health of the individual circuit. That data can be significantly impacted by ambient conditions (temperature and humidity) and by whether the actual process (piping/tank/vessel/instrument) is operating at the exact time that the data is recorded. Each "snapshot" can provide vastly different information and as such, each "snapshot" can be misleading to the user. A "snapshot" can provide a false sense of security, even when a potentially catastrophic failure is imminent.

No matter the complexity or the simplicity of today's monitoring systems and/or EHT system audits, they all suffer from one drawback, and that is that they do not provide users with effective data over a period of time in order to predict faults or potential failures of the heat trace circuits.

SUMMARY OF THE INVENTION

Disclosed is a monitoring, and testing system for one or more electrical heat trace cables, the system comprising one or more electrical inputs corresponding to the one or more electrical heat trace cables; a programmable logic controller; an insulation resistance tester adapted to measure and transmit the resistance in the one or more electrical heat trace cables when electrically connected to the one or more electrical heat trace cables; a temperature and humidity sensor adapted to measure and transmit ambient temperature and humidity; a current monitor adapted to receive and transmit current measurements; one or more current transducers electrically connected to the one or more electrical heat trace cables and adapted to measure and transmit current measurements in the one or more electrical heat trace cables to the current monitor; a system network switch connected to a digital network; and a relay subsystem selectable between an operational state and a testing state based on an input from the programmable logic controller; wherein when the relay subsystem is in the operational state, the one or more electrical inputs are electrically connected to the one or more electrical heat trace cables; wherein when the relay subsystem is in the test state, the insulation resistance tester is electrically connected to the one or more electrical heat trace cables; wherein the insulation resistance tester, the current monitor, and the temperature and humidity sensor are programmed to periodically transmit their measurements to the network switch; wherein the system network switch is adapted to transmit to the digital network the measurements received from the insulation resistance tester, the current monitor, and the temperature and humidity sensor.

In some embodiments the monitoring, and testing system may optionally further comprise a data acquisition and communication (DAC) subsystem, the DAC subsystem comprising a DAC network switch connected to the digital network; a central processing unit ("CPU"); and a router; wherein the DAC network switch is adapted to receive through the digital network the measurements from the insulation resistance tester, the current monitor, and the temperature and humidity sensor; wherein the CPU is programmed to store the measurements from the insulation resistance tester, the current monitor, and the temperature and humidity sensor; and wherein the router is adapted to transmit from the CPU to a server the measurements from the insulation resistance tester, the current monitor, and the temperature and humidity sensor.

In some embodiments the monitoring, and testing system may optionally further comprise a power distribution subsystem, the power distribution subsystem comprising a soft start controller adapted to receive an incoming electrical signal and, when activated, to distribute the incoming electrical signal as the one or more electrical inputs; and a thermostat adapted to activate the soft start controller when the ambient temperature is above an activation temperature, and to deactivate the soft start controller below the when the ambient temperature is below a deactivation temperature.

Problem to be Solved

How to provide a flexible, scalable, and low installed cost electric heat trace monitoring system that can also optionally provide power distribution to the heat trace circuits, and that:
- provides meaningful data (not simply amperage readings—insulation resistance of the EHT circuit under varying conditions is the best indicator of the health of an EHT system
- presents information in a "user friendly" format or dashboard
- provides the user with the necessary information and tools to quickly identify an issue with an EHT line in an "alarm" situation
- provides longer term data that is analyzed to provide trends in individual EHT circuits so that plant management can proactively make the repairs or improvements required to maintain the integrity of their EHT system.

Solution Provided by the Invention

The system of the disclosed invention, which provides a solution, is comprised of these substantive parts: (1) power distribution to the individual heat trace circuits, and (2) alarm functionality in the case of an imminent or immediate EHT failure that aids plant personnel to quickly identify where in the plant they need to investigate the existing or imminent failure; and (3) on a longer term basis, data accumulation functionality, of both the amperage and resistance measurements (for example), which in the variable contexts previously indicated, permits a trend analysis to identify probable failure of specific EHT circuits.

Part 1—Power Distribution from a Main Contactor to Individual Heat Trace Circuits:
  This is accomplished by incoming electrical power into a
    main contactor; which is controlled via a locally
    installed (on the exterior of the panel) temperature
    switch; with the main contactor wired to a "Soft Start"

device that limits and adjusts "inrush current" so as not to overload any individual circuit upon startup; which then feeds into a series of individual 30 amp breakers, each with 30 mA ground fault circuit protection. This power distribution system then supplies power through the individual breakers to the individual electric heat trace circuits.

Part 2—Visually Alert Functionality:

This is accomplished by collecting the data from the multiple system cabinets housing the EHT monitoring system located throughout the plant via a data acquisition and communications ("DAC") device located at the plant. The data collected contains measurements in amperage and insulation resistance, along with status of the soft starter and status of all contactors to determine if a contactor has failed. The DAC may optionally be hard wired to an internet access point owned/leased by the operator of the EHT monitoring system at the plant site.

The DAC pushes the data on a continuous feed to a server (optionally a "cloud" server) managed, for example, by the operator of the EHT monitoring system with the data being formatted into a Human Machine-Interface ("HMI") (or display dashboard) that mimics a traditional "Circuit Breaker Panel" similar to an actual Electric Heat Trace Power Distribution Panel ("EHTDP")

The operator assigns a URL web address for each plant, accessed by username and password, such that the operations personnel (at the plant site and/or remotely) can display this information on computer terminals/monitors continuously.

Once an alarm has is indicated, operations personnel is able to "click" on the dashboard and view where the alarm is located on the EHTDP. They are able to "click through" and view all of the branch EHT lines that are associated with that circuit breaker ("CB"), see their individual descriptions; locations within the plant; EHT drawing; plant layout with GPS markers; photographs of specific installs; and any other specific details that the plant has designated as important.

The ability for plant personnel to quickly and accurately access this level of data is critical in order to resolve an "alarm" situation before it impacts the plant's operations.

Part 3—Long Term Contextual Predictive Analysis:

The disclosed solution comprises a trending analysis of meaningful information (measurements over time, in the context of ambient conditions and process operations) of the key electrical attributes (insulation resistance of the electric heat trace cables measured in ohms and megohms, and possibly others,) environmental conditions (such as temperature and humidity, and possibly others), and possibly other relevant data (such as of plant operations, or of heat trace material type), such that the user can immediately assess the health of each EHT circuit and prioritize any needed preventive maintenance before an EHT circuit faults or fails.

This trending analysis may include machine learning techniques, such as neural networks, that analyze all available historical data and produce an estimate of the likelihood of failure. These neural networks can be trained continuously over time, as new data is collected, to improve their prediction accuracy. And very importantly, the disclosed system can be utilized with multiple types of electric heat trace cables and accessories.

Utilizing trending software, the disclosed system will provide periodic reports indicating individual EHT circuit information. These reports will contain data that details all branch EHT lines associated with each EHTPD circuit breaker, such that the customer can easily identify and prioritize the critical EHT lines that should be repaired/replaced prior to failure.

Monitoring of Components in Instrument Enclosures:

Process instruments in an industrial plant provide measurements of various process attributes (pressure, flow, level, temperature, differential pressure, etc.) to a control room and its main computer control center. The computers (and their software) make constant adjustments to valves, pumps, dampers, to more fully open, or close or to change their state, in general, to optimize the process according to the overall process design parameters of the plant. Obtaining and transmitting these process attributes accurately is essential to maintain process control. Process control is impossible if incoming process measurements are inaccurate or interrupted for any reason. Maintaining a desired ambient temperature range for these process instruments, a temperature that is within its rated operating range, is therefore crucial to the instrument's proper functioning, and to the entire plant's performance.

A common method of maintaining the instrument's appropriate temperature range is to place the instrument within what is referred to as an "instrument enclosure". These enclosures are generally fabricated from a material that has good insulating characteristics, has a gasketed surface on both "halves" of the enclosure, and contains a heater to replace lost heat.

In cold temperature situations, the enclosures themselves and their heaters can each develop faults/failures that lead to the instrument falling below their rated temperature range.

The present invention also provides for a system to add a temperature sensor (either thermocouple or thermistor) to the interior of the physical instrument enclosure; wiring this sensor to the local field enclosure cabinet (FEC); adding a temperature sensor interface to the field enclosure cabinet; including this data into the dataset sent to the DAC; and adding this data (including alerts/alarms based on site specific setpoints) to the dashboard available to the customer.

If the temperature inside of the instrument enclosure falls below the alarm setpoint, an alarm is issued through the dashboard, and plant operators can take immediate remediation efforts for that specific instrument enclosure in order to maintain the instrument's integrity.

Additionally, from a human safety standpoint, in many areas of the plant these instrument enclosures are located in areas that are difficult to access under normal weather conditions. In the event of a severe weather situation (high winds, rain, snow, sleet, etc.) traveling up multiple flights of exterior metal stairs, even perhaps at night, can be extremely dangerous. Thus, plant management is reluctant to deploy plant operators to perform their "rounds" to check on the status of the instrument enclosures (traditionally done by visual checks) due to potential safety hazards. The result can be that an instrument enclosure has failed and the only way the plant becomes aware is through the subsequent process upset.

The disclosed remote instrument enclosure temperature monitoring system negates the need for a plant operator to visually check on any instrument enclosure and provides constant information to the control room. Process upsets are avoided. Human safety is improved.

DETAILED DESCRIPTION OF EMBODIMENTS OF THE INVENTION

Field Enclosure Cabinet

Figure 1:
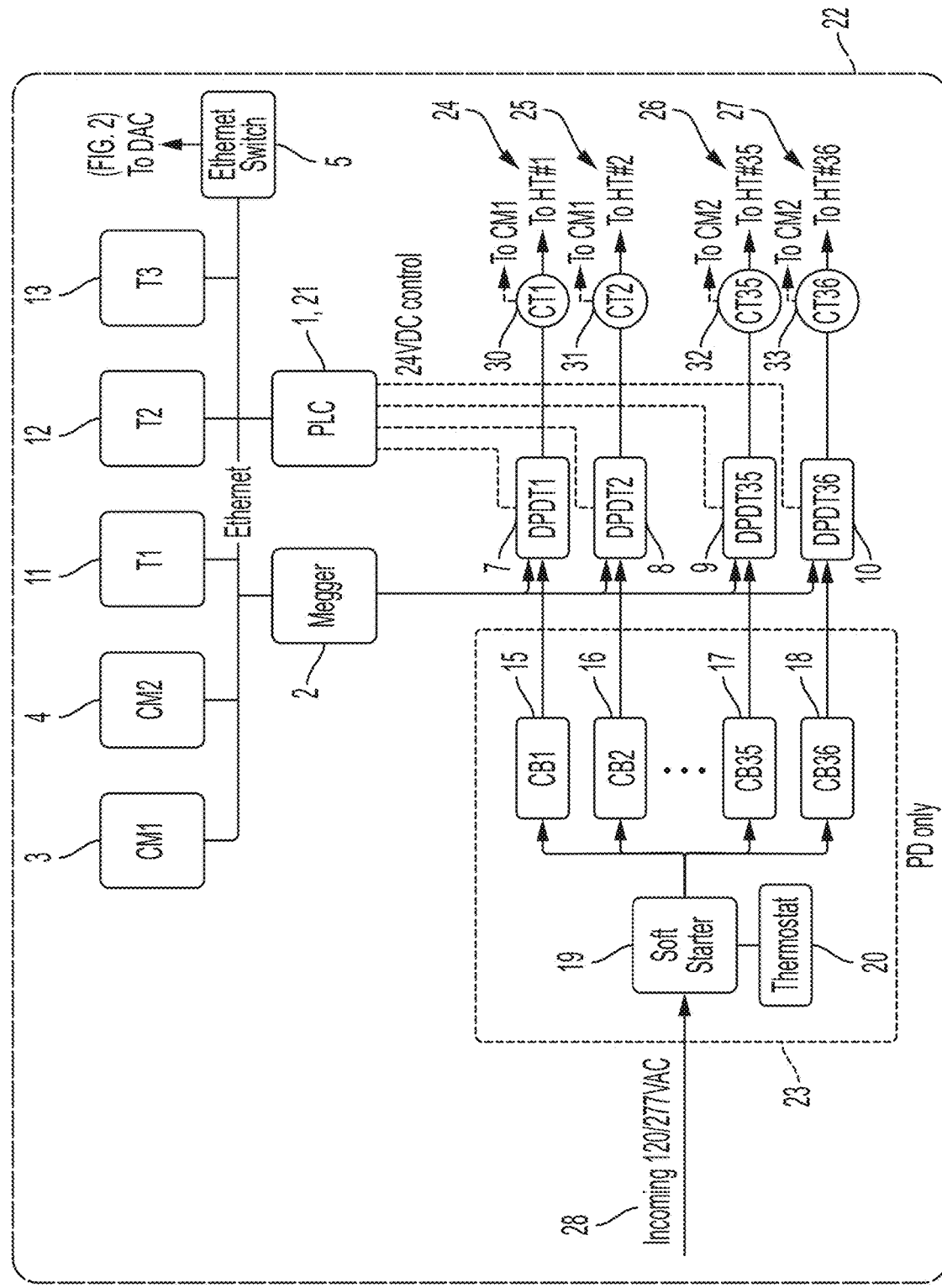
FIG. 1 is a schematic diagram that illustrates the various component parts of a field enclosure cabinet according to an embodiment of the present invention.

As shown in FIG. 1, the FEC (100) in one embodiment of the present invention comprises the following components:
1 Programmable Logic Controller (PLC)
2 Insulation Resistance Tester (IRT or Megger)
3-4 Continuous Current Fault Monitoring Meters 1 and 2
5 Ethernet Switch
7-10 DPDT Relay Subsystems
11 Temperature and Humidity Sensor
12-13 Multi-Channel Temperature Interfaces 1 and 2
30-33 Current Transducers
15-18 Circuit Breakers
19 Soft Start Controller
20 Thermostat
21 Software
22 Enclosure The FEC (100) comprises an enclosure (22) housing all components. The FEC (100) may optionally comprise a power distribution module (23), which includes a soft start controller (19), thermostat (20) and circuit breakers (15-18). The power distribution module (23) distributes power to the individual EHT cables (24-27) serviced by the FEC (100). In embodiments where power distribution capabilities are not provided by the FEC (100), the components in the power distribution module (23) and be omitted, and the FEC (100) will receive incoming power for each individual EHT cable and supply it directly to its respective DPDT relay subsystem (7-10)

The FEC (100) further comprises a programmable logic controller ("PLC") (1), programmed using customized software (21) to perform the functions herein described, a temperature and humidity sensor (11) adapted to measure local site ambient conditions, as well as multi-channel temperature interfaces (12-13) adapted to receive temperature readings from remote temperature sensors such as for remote instrument enclosures (not shown) also serviced by the FEC (100).

In embodiments that include power distribution, the FEC (100) is intended to replace an existing Electric Heat Trace Distribution Panel (EHTDP) (not shown) already installed at the facility. In embodiments that don't include power distribution, the FEC (100) is intended to be installed downstream from the EHTDP. In embodiments that include power distribution, a single power input (28) is fed to the soft start controller (19), which is, in turn, controlled by a thermostat (20) that ensures that no power is distributed unless ambient temperature is below a setpoint. The soft start controller distributes power to individual circuit breakers (15-18), for circuit overload protection, which in turn are wired to a DPDT relay subsystems (7-10). In embodiments without power distribution, each power circuit from the EHTDP is wired directly to a corresponding DPDT relay subsystem (7-10).

Each DPDT relay subsystem (7-10) may comprise one relay or a set of relays, rated for 277 vac and 40 amps, with an isolation voltage of at least 1000 VDC, that is controlled by the PLC (1), and which effectively forms a double-pole double-throw (DPDT) switch.

The DPDT relay subsystem (7-10) is designed or wired in such a way as to cause, when the PLC (1) sends a logical "0" or "low" signal via one of its output modules, the two conductors comprising the EHT cables (24-27) to be connected to the associated circuit to be switched to incoming power. When the PLC sends a logical "1" or "high" signal via one of its output modules, the two conductors comprising the EHT cables (24-27) are switched to the IRT (2) system input. This wiring design ensures that the EHT cables (24-27) can always be powered in the event of any PLC (1) failure by removing power to the PLC (1) via an "emergency override" switch that can isolate failed test equipment and ensure continued power to the EHT cables (24-27).

Each set of EHT cables (24-27) connected to a DPDT relay subsystem (7-10) interfaces with a current transducer ("CT") (30-33) which measures the current on its corresponding EHT Cable . . . . Each CT (30-33) in turn transmits its current measurement to the one or more continuous current fault monitoring meters ("CM") (3-4), which collect the current measurements and transmit them to a remote data acquisition and communication device ("DAC") (200, see FIG. 2) via the ethernet switch (5).

The PLC (1) can be programmed to conduct periodic tests of the EHT cables (24-27). During these tests, the PLC (1) will send a logical "1" signal to the DPDT relay subsystems (7-10) to change their position. The result is that the EHT cables (7-10) will be disconnected from incoming power, but the EHT cables (7-10) will be connected to the IRT and ready for testing.

The PLC (1) will send a signal to the IRT to begin the insulation resistance test (commonly referred to as a "megger" test). These tests will be different based upon which routine the PLC (1) is currently executing (which may be based on ambient temperature, the type of EHT cable, and other variables).

All data collected by the FEC (100), including operational and testing data for the EHT cables (7-10) and sensors, which optionally includes without limitation the date, time, voltage, current (from the CMs (3,4)), resistance, temperature (including temperature from instrument enclosures), humidity, and possibly other metrics, is routed through the ethernet switch (5) to the DAC (200, see FIG. 2) where it is recorded and stored for later analysis and display.

Data Acquisition and Communications Device

Figure 2:
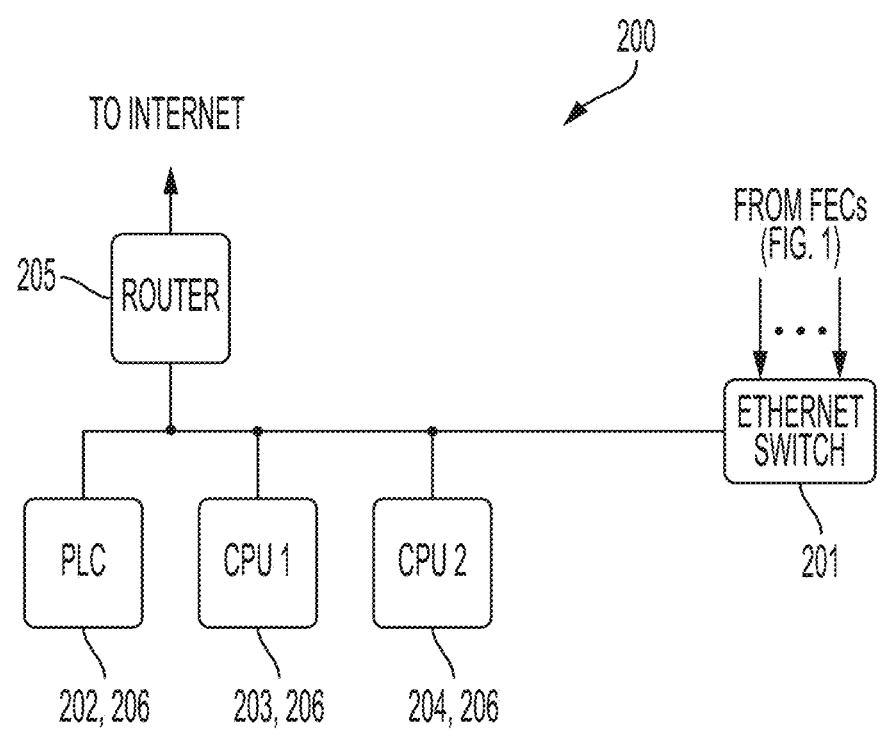
FIG. 2 is a schematic diagram of a data acquisition and communications device in accordance with an embodiment of the present invention.

As shown in FIG. 2, the DAC (200) in one embodiment of the present invention comprises the following components:
201 Ethernet Switch
202 Programmable Logic Controller (DAC-PLC)
203 Primary CPU
204 Backup CPU
205 Router
206 DAC Software Referring to FIG. 2, the DAC (200) is used to collect and record data from one or more FECs, and optionally upload this data to a server or servers. The DAC (200) further comprises an ethernet switch (201), which is adapted to receive the data from the FECs. The DAC also comprises a programmable logic controller (DAC-PLC) (202), programmed using customized DAC software (206) to perform the functions herein described, a primary central processor unit (CPU) (203), and a backup CPU (204). The primary CPU (203) controls the operation of the DAC (200) while the backup CPU (204) provides redundant data storage and control in case of primary CPU (203) failure. The two CPUs (203, 204) are also programmed using customized DAC software (206). Data collected through the Ethernet switch (201) is saved in both the primary CPU (203) and backup CPU (204) and optionally is uploaded to a server or servers (not shown) which can be located on-site, or remotely in the "cloud," by means of a router (205). The DAC-PLC (202) acts as a "watchdog" for the primary CPU (203), backup CPU (204), and router (205), by monitoring their operation and power cycling if it detects that they stop responding to queries.

Figure 4:
FIG. 4 is an exemplary dashboard display in accordance with an embodiment of the present invention.

The data collected by the DAC (200) is used to provide the real-time data display (see FIG. 4) for the plant operators, and as input to the Long Tenn Contextual Predictive Analysis described above in part 2. To implement the display of the real-time data and of the Long Tenn Contextual Predictive Analysis, the primary CPU (203) and backup CPU (204) run web servers capable of serving the data to any web browser running on any computer connected to the Ethernet Switch (201). In addition, if the data collected is additionally routed to a server or servers, such server or servers also can run web servers to provide the data. Whether provided locally at the plant or remotely, the same data is served. The primary use of remote servers is to allow access to data by off-site personnel, such as via the internet, and to optionally aggregate data from multiple plants. The system has, at least, two main "routines" that it will follow based upon the ambient conditions. These are a WARM routine and a COLD routine.

WARM Routine

The WARM routine is indicated when the ambient temperature is greater than about 40 deg F., or whatever ambient temperature setpoint is selected by the plant operator. As previously stated, there is a temperature and humidity sensor mounted at each FEC (100). The measurements will be recorded to the DAC (200) whenever a megger test is performed.

Traditionally, EHT systems have been controlled by a thermostat (some are permanently fixed at 40 deg F., others can be manipulated to various setpoints) such that when the temperature is less than 40 deg F. the thermostat "makes" or completes the circuit to the main power distribution contactor within the power distribution panel, thus energizing all of the circuit breakers within that panel. The voltage is fed to the individual circuits, powering the electric heat trace cables themselves that have been affixed to piping, tanks/vessel, instrumentation etc.

If the temperature is greater than 40 deg F. then the thermostat remains "open" and the circuit to the contactor within the power distribution panel remains "open", as well. Thus, no power is flowing to the electric heat trace cables. When there is no power to the electric heat trace system, no amperage measurements or ground fault indication can take place.

During WARM routine operation, The PLC (1) will be configured such that if the temperature is greater than 40 deg F., it will wait 168 hours (7 days) and then perform the following test. This testing will continue every 168 hours until the temperature falls less below 40 deg F. The time of day is not necessarily of importance when performing this test, but if desired, the system can be programmed to implement both a "time of day" requirement and a temperature requirement before a test is performed.

Panel Sequence of Operations for WARM Routine

Figure 3A:
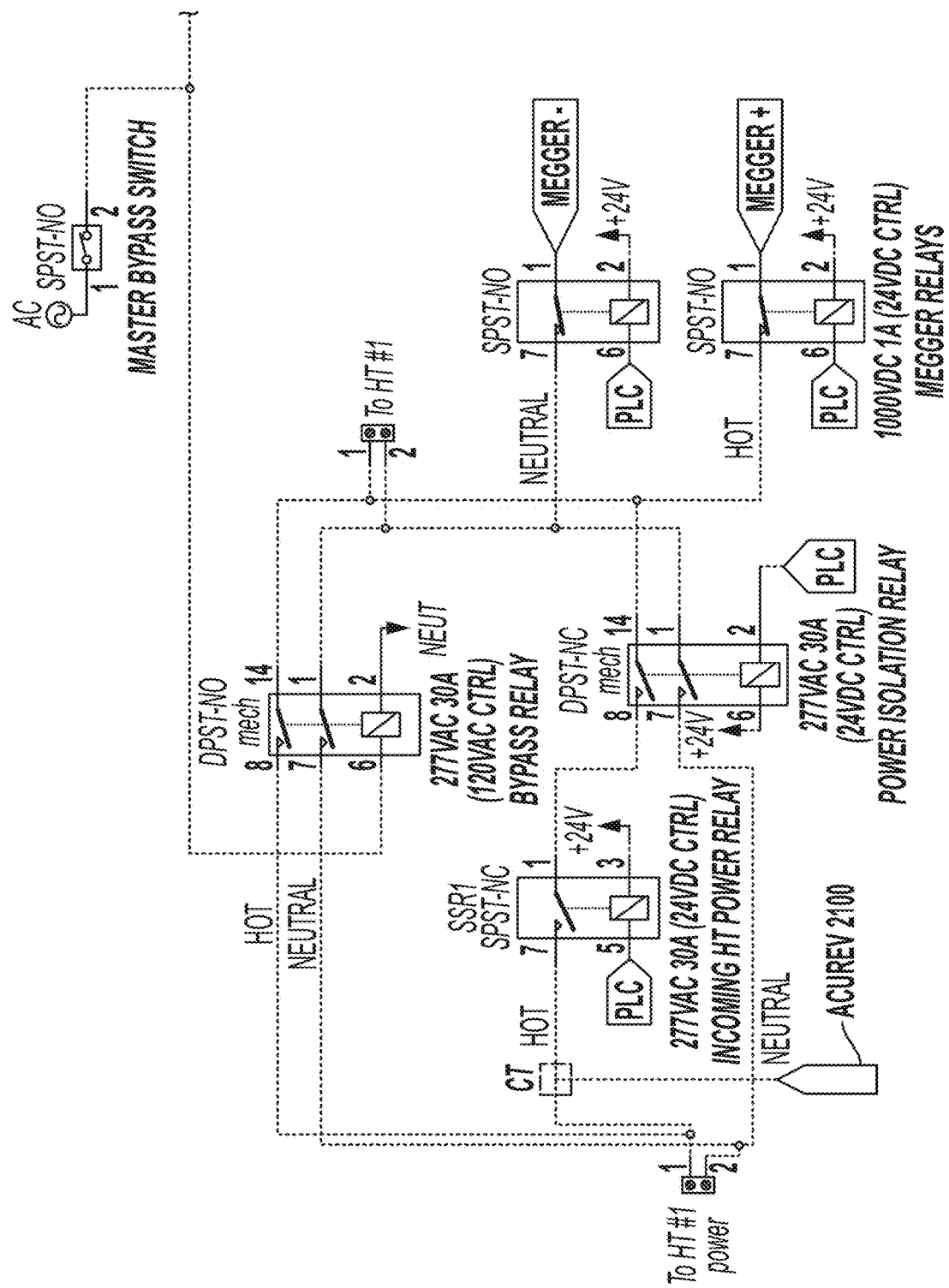
FIG. 3A is an exemplary electrical diagram of a two-circuit electrical heat trace monitoring circuit in accordance with an embodiment of the present invention.

Referring next to FIG. 3A, shown is a sample electrical circuit for DPDT relay subsystems (7-10) in a 2 cable EHT system. Note: for illustration purposes the following sequence will refer to circuits 1 and 2 ("ckt 1" and "ckt 2") of an FEC (100) employed in the present invention.

The PLC (1) will output a signal to the ckt 1 DPDT relay subsystem (7-10) to switch that circuit from power to the IRT (2). The PLC (1) then sends a signal to the power supply of the IRT (2), which powers up the IRT (2) to begin its test for circuit #1.

The test will run for 10 minutes and record readings every 30 seconds. At the end of 10 minutes, after a wait of 2 seconds, the output signal to the IRT (2) relay circuit #1 and to IRT (2) power supply will be discontinued.

The PLC (1) will then output a signal to the ckt 1 DPDT relay subsystem (7-10) to switch that circuit from the IRT to incoming power, wait 2 seconds, and repeat the sequence for circuit #2. After circuit #2 is complete, it will continue the routine for all additional circuits (if any.)

COLD Routine

The COLD routine is indicated when the ambient temperature is less than 40 deg F. (or other selected setpoint). It is identical in procedure to the "WARM" routine except for the following differences:

If the temperature is less than 40 deg F. then the thermostat remains "closed" completing the circuit to the contactor within the FEC (1) which will then "close" and allow voltage to all of the circuit breakers within that FEC (1), and thus power to the individual EHT circuits and cables. When there is power to the EHT system, current measurements and ground fault indication can take place and will be recorded in the DAC (200) and displayed. Measurements will be continuous (approximately every second), and recordings will take place every 120 seconds.

The PLC (1) will be configured such that if the temperature is less than 40 deg F., it will wait 24 hours (1 day) and then perform the following tests. This testing will continue every 24 hours until the temperature is greater than 40 deg F. The time of day is not necessarily of importance when performing this test, but if desired, the system can be programmed to implement both a "time of day" requirement and a temperature requirement before a test is performed.

Panel Sequence of Operations for COLD Routine

Figure 3A:
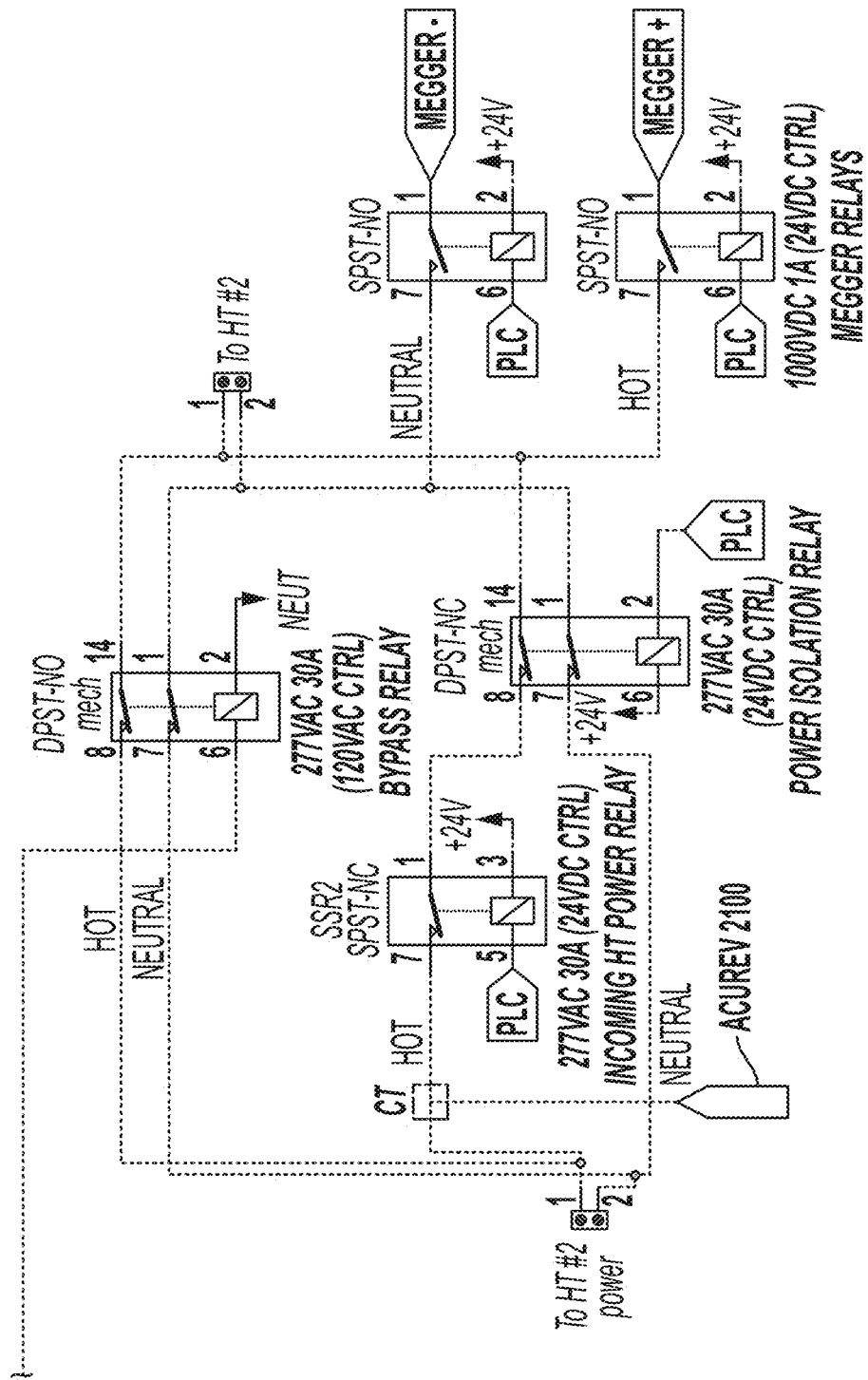

Referring again to FIG. 3, the PLC (1) will output a signal to the ckt 1 DPDT relay subsystem (7-10) to switch that circuit from power to the IRT (2).

The PLC then sends a signal to the power supply of the IRT (2), which powers up the IRT (2) to begin its test for circuit #1.

The test will run for 2 minutes and record readings every 10 seconds.

At end of 2 minutes, the PLC (1) will output a signal to the circuit #1 DPDT relay subsystem (7-10) to switch that circuit from the IRT to incoming power. After a wait 2 seconds, the sequence is repeated for circuit #2.

After circuit 2 is complete, the routine is repeated for all other circuits, if any.

Figure 3B:
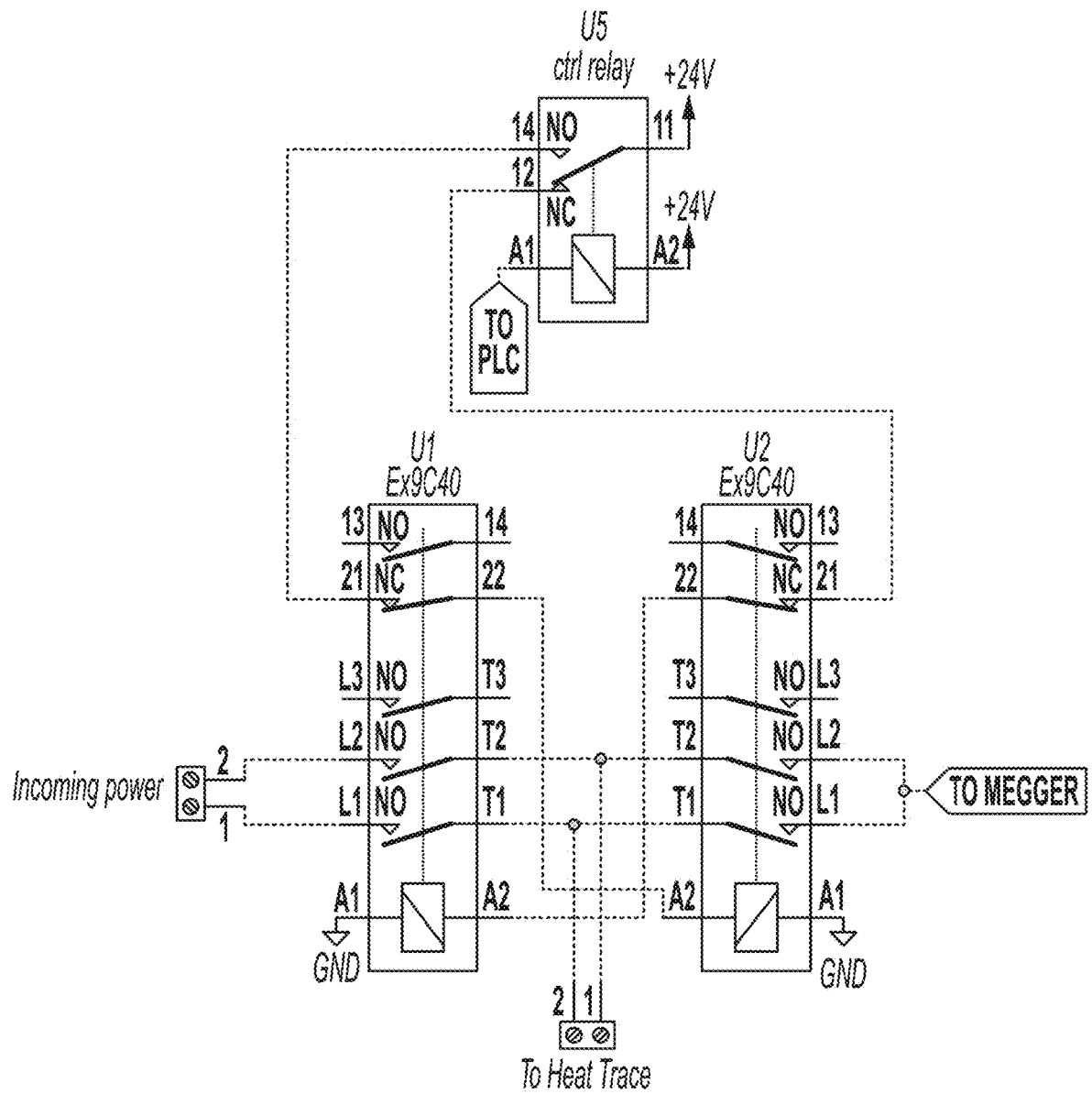
FIG. 3B is an exemplary electrical diagram of a one-circuit electrical heat trace monitoring circuit in accordance with an alternative embodiment of the present invention.

Shown in FIG. 3B is a sample electrical circuit for DPDT relay subsystems (7-10) in a 1 cable EHT system according to an alternative embodiment of the invention. It should be understood that there are several different ways of wiring the DPDT relay subsystems (7-10) without departing from the spirit of the invention and within the scope and range of equivalent of the embodiments described in FIGS. 3A and 3B.

In summary, the disclosed electric heat trace monitoring system will benefit users in the following ways:

Enable the user to increase profits through more "run time" without disruption from emergency situations created by non-functional electric heat trace systems.

Improve human resource allocations because trained, technical personnel will not be called on to "fix" non-working electric heat trace systems.

Provide "insurance" protection for equipment from freezing and maintaining process temperatures.

Provide a cost-effective means to monitor existing electric heat trace systems regardless of heat trace cable manufacturer—it is "neutral" to the specific manufacturer.

Provide synthesized information on a dashboard as to the health and well-being of their entire heat trace system being monitored "at a glance".

Enable the user to quickly react to any alarm situation by being able to "click through" a series of hyperlink screens for detailed information on each branch EHT line associated with the circuit breaker.

Provide meaningful and contextual data for trending—in order to predict when a system, or a portion of the electric heat trace system may fail—creating an opportunity for proactive maintenance.

Although described above in connection with certain specific configurations and industries, these descriptions are not intended to be limiting as various modifications may be made therein without departing from the spirit of the invention and within the scope and range of equivalent of the described embodiments.

Any reference in this specification to "one embodiment," "an embodiment," an "example embodiment," etc., means that a particular feature, structure, or characteristic described in connection with the implementation is included in at least one embodiment of the invention. The appearances of such phrases in various places in the specification are not necessarily referring to the same embodiment. In addition, any elements or limitations of any invention or embodiment thereof disclosed herein can be combined with any and/or all other elements or limitations (individually or in any combination) or any invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

We claim:

1. A monitoring, and testing system for one or more electrical heat trace cables, the system comprising:
   one or more electrical inputs corresponding to the one or more electrical heat trace cables;
   a programmable logic controller;
   an insulation resistance tester adapted to measure and transmit the resistance in the one or more electrical heat trace cables when electrically connected to the one or more electrical heat trace cables;
   a temperature and humidity sensor adapted to measure and transmit ambient temperature and humidity;
   a current monitor adapted to receive and transmit current measurements;
   one or more current transducers electrically connected to the one or more electrical heat trace cables and adapted to measure and transmit current measurements in the one or more electrical heat trace cables to the current monitor;
   a system network switch connected to a digital network; and
   a relay subsystem selectable between an operational state and a testing state based on an input from the programmable logic controller;
   wherein when the relay subsystem is in the operational state, the one or more electrical inputs are electrically connected to the one or more electrical heat trace cables;
   wherein when the relay subsystem is in the test state, the insulation resistance tester is electrically connected to the one or more electrical heat trace cables;
   wherein the insulation resistance tester, the current monitor, and the temperature and humidity sensor are programmed to periodically transmit their measurements to the network switch;
   wherein the system network switch is adapted to transmit to the digital network the measurements received from the insulation resistance tester, the current monitor, and the temperature and humidity sensor.

2. The monitoring, and testing system of claim 1 further comprising a data acquisition and communication (DAC) subsystem, the DAC subsystem comprising:
   a DAC network switch connected to the digital network;
   a central processing unit ("CPU"); and
   a router;
   wherein the DAC network switch is adapted to receive through the digital network the measurements from the insulation resistance tester, the current monitor, and the temperature and humidity sensor;
   wherein the CPU is programmed to store the measurements from the insulation resistance tester, the current monitor, and the temperature and humidity sensor; and
   wherein the router is adapted to transmit from the CPU to a server the measurements from the insulation resistance tester, the current monitor, and the temperature and humidity sensor.

3. The monitoring, and testing system of claim 2 further comprising a power distribution subsystem, the power distribution subsystem comprising:
   a soft start controller adapted to receive an incoming electrical signal and, when activated, to distribute the incoming electrical signal as the one or more electrical inputs; and
   a thermostat adapted to activate the soft start controller when the ambient temperature is above an activation temperature, and to deactivate the soft start controller when the ambient temperature is below a deactivation temperature.

4. The monitoring, and testing system of claim 2 wherein the measurements received by the server are inputted into a trending software to generate periodic reports of the measurements from the insulation resistance tester, the current monitor, and the temperature and humidity sensor.

5. The monitoring, and testing system of claim 4 wherein the trending software comprises a machine learning technique adapted to analyze the measurements to estimate a likelihood of failure of the one or more electrical heat trace cables.

* * * * *